United States Patent
Stemm et al.

(10) Patent No.: US 10,907,587 B2
(45) Date of Patent: Feb. 2, 2021

(54) AIR DUCT WITH IN-MOLDED ANTI-CRUSH RING

(71) Applicant: ABC Group, Inc., Toronto (CA)

(72) Inventors: Michael Stemm, Lapeer, MI (US); Danny Cacciacarro, Mississauga (CA); Stanley S. Marosek, Ajax (CA); Scott A. Wellman, Plymouth, MI (US)

(73) Assignee: ABC TECHNOLOGIES INC., Toronto (CA)

( * ) Notice: Subject to any disclaimer, the term of this patent is extended or adjusted under 35 U.S.C. 154(b) by 764 days.

(21) Appl. No.: 15/307,705

(22) PCT Filed: Apr. 29, 2015

(86) PCT No.: PCT/US2015/028271
§ 371 (c)(1),
(2) Date: Oct. 28, 2016

(87) PCT Pub. No.: WO2015/168271
PCT Pub. Date: Nov. 5, 2015

(65) Prior Publication Data
US 2017/0058845 A1    Mar. 2, 2017

Related U.S. Application Data

(60) Provisional application No. 61/986,655, filed on Apr. 30, 2014.

(51) Int. Cl.
*F02M 35/10* (2006.01)
*F16L 57/02* (2006.01)
(Continued)

(52) U.S. Cl.
CPC ... *F02M 35/10091* (2013.01); *B29C 48/0017* (2019.02); *B29C 48/09* (2019.02);
(Continued)

(58) Field of Classification Search
CPC ........ F02M 35/10091; F02M 35/10144; F16L 21/065; F16L 57/02
(Continued)

(56) References Cited

U.S. PATENT DOCUMENTS

| 277,427 A | * | 5/1883 | Recht | F16L 13/146 |
| | | | | 285/382.2 |
| 1,837,103 A | * | 12/1931 | Betz | F16L 13/04 |
| | | | | 285/229 |

(Continued)

FOREIGN PATENT DOCUMENTS

| EP | 1775510 A1 | * | 4/2007 | ....... F02M 35/10144 |
| EP | 2562409 | | 2/2013 | |

(Continued)

OTHER PUBLICATIONS

First Office Action dated Apr. 28, 2018 in corresponding Chinese Patent Application No. 201580036057.X.
(Continued)

*Primary Examiner* — Matthew Troutman
*Assistant Examiner* — Fannie C Kee
(74) *Attorney, Agent, or Firm* — Medler Ferro Woodhouse & Mills PLLC

(57) ABSTRACT

A turbo duct is disclosed that includes a primary body having an inlet end, an outlet end, and an internal air passageway that communicates therebetween. An anti-crush ring is operably associated with at least one of the inlet and outlet ends. The inlet and outlet ends of the primary body are dimensioned to receive a cuff for connection of the turbo duct within an engine assembly. The anti-crush ring is situated on an outside surface of the turbo duct so as to form an intermediate anti-crush structure between the contact surfaces of the turbo duct and the cuff attached thereto. Also provided is a process for manufacturing the turbo duct.

8 Claims, 17 Drawing Sheets

(51) Int. Cl.
   *F16L 21/06*  (2006.01)
   *B29C 49/04*  (2006.01)
   *B29C 48/09*  (2019.01)
   *B29C 48/00*  (2019.01)

(52) U.S. Cl.
   CPC ....... *B29C 49/04* (2013.01); *F02M 35/10144* (2013.01); *F02M 35/10157* (2013.01); *F02M 35/10321* (2013.01); *F02M 35/10347* (2013.01); *F16L 21/065* (2013.01); *F16L 57/02* (2013.01); *Y02T 10/12* (2013.01)

(58) Field of Classification Search
   USPC ......................................... 285/242, 399–400
   See application file for complete search history.

(56) References Cited

U.S. PATENT DOCUMENTS

| | | | | |
|---|---|---|---|---|
| 3,375,025 A | * | 3/1968 | Engel | F16L 19/0206 285/15 |
| 3,850,453 A | * | 11/1974 | Bentley | F01N 13/14 285/47 |
| 4,486,035 A | * | 12/1984 | Storke | F16L 33/22 285/242 |
| 4,923,226 A | * | 5/1990 | Bartholomew | F16L 33/225 285/242 |
| 5,169,176 A | * | 12/1992 | Brossard | B29C 61/0658 156/84 |
| 5,310,224 A | | 5/1994 | Tenglund | |
| 5,582,437 A | * | 12/1996 | Bartholomew | F16L 33/00 285/272 |
| 2006/0054231 A1 | | 3/2006 | Wolfrom et al. | |
| 2009/0211659 A1 | | 8/2009 | Schelhaas et al. | |

FOREIGN PATENT DOCUMENTS

| | | | |
|---|---|---|---|
| JP | H03-271557 A | | 12/1991 |
| JP | 04041971 A | * | 2/1992 |
| WO | 2010/060945 A1 | | 6/2010 |

OTHER PUBLICATIONS

Extended European Search Report dated Oct. 23, 2017 in corresponding European Patent Application No. 15 78 5707.

Communication pursuant to Rules 70(2) and 70a(2) EPC dated Nov. 23, 2017 in corresponding European Patent Application No. 15 78 5707.

International Search Report and Written Opinion dated Sep. 29, 2015 in PCT/US2015/028271.

* cited by examiner

AIR DUCT WITH IN-MOLDED ANTI-CRUSH RING

FIELD OF THE INVENTION

The present invention relates to the field of blow molded hollow articles, and in particular to a blow molded automotive air induction/turbo duct.

BACKGROUND

A basic principle in a turbocharged engine system is that wasted energy is converted back into work. In general terms, this is achieved by harnessing the engines exhaust gases to drive a turbine wheel within a turbo housing, thus spinning a compressor wheel directly attached to the turbine by a common shaft, thereby compressing ambient air. This compressed air is delivered back into the engine's air intake system through a turbo duct, thereby delivering a greater mass of air for each intake stroke. The end effect is increased engine power output and/or fuel efficiency.

In the effort to move towards light-weight materials, automotive systems including engine systems have seen the incorporation of increased thermoplastic materials. While effective in many applications, their use in engine systems comes with certain challenges. The need to withstand increased heat and exposure to chemicals is driving the industry to explore new high performance compositions. As such, there are a growing number of engine components now being manufactured from polymeric materials.

In such systems, a known issue with thermoplastic materials is material creep. Material creep is the slow continuous deformation of a solid under the action of a constant load, and is known to be more pronounced at high temperatures. In an engine system, in particular with thermoplastic structures associated with elevated temperatures, the ability to ensure overall system integrity becomes a challenge. While the use of clamps and other connection hardware can be effectively implemented, over time the secure connections can become loose, with increased risk of system leakage and/or failure.

Having regard to air induction systems and turbo ducts in particular, the delivery of compressed air at elevated temperatures creates an overall condition that is at increased risk of system integrity failure due to material creep. In a turbo system, the inability to maintain the compressed ambient air results in a loss of power output and/or fuel efficiency, thereby negating the gains of a turbocharged system. Accordingly, there is a growing need to improve unit connectivity in thermoplastic systems such as the turbo and air induction system in automobiles.

SUMMARY OF THE INVENTION

According to an embodiment, provided is a turbo duct. The turbo duct comprises a primary body having an inlet end, an outlet end, and an internal air passageway that communicates therebetween. An anti-crush ring is operably associated with at least one of the inlet and outlet ends. The inlet and outlet ends of the primary body are dimensioned to receive a cuff for connection of the turbo duct within an engine assembly. The anti-crush ring is situated on an outside surface of the turbo duct so as to form an intermediate anti-crush structure between the contact surfaces of the turbo duct and the cuff attached thereto.

According to another embodiment, provided is a process for blow molding a turbo duct, the process comprising positioning between first and second mold halves of an open mold tool an anti-crush ring at a selected location. The first and second mold halves are then closed, thereby defining the molding cavity and locking the anti-crush ring at the selected location. Vacuum is applied to the bottom of the mold tool while introducing into the cavity an extruded parison, thereby drawing the extruded parison through the cavity including the anti-crush ring situated therein. The top and bottom of the parison is pinched to define a closed internal chamber. By way of one or more blow pins, pressurized air is introduced into the closed internal chamber to inflate the parison and urge it against the contours of the cavity. On sufficient cooling, the mold tool is opened to release the formed hollow article. The formed hollow article is subject to post-mold processing to obtain the finished turbo duct.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology as applied to automotive turbo ducts, the invention may also be applied in other air induction systems. The invention may find application in other ways, for example with thermoplastic articles in general that require additional support at coupling points (e.g. inlet/outlet ports) to resist deforming under load from a clamp or similar restraining device. Furthermore, there is no intention to be bound by any expressed or implied theory presented in the preceding technical field, brief summary, background or the following detailed description.

In the following, a blow molded automotive turbo duct is described. The automotive turbo duct is formed of thermoplastic material, and is generally of one-piece form. The automotive turbo duct incorporates one or more anti-crush rings in-molded at respective locations requiring additional anti-crush resistance, in particular where the turbo duct cooperates with suitable couplers for attachment of the turbo duct into the engine assembly. Also described is an exemplary method of forming such an automotive turbo duct.

Figure 1:
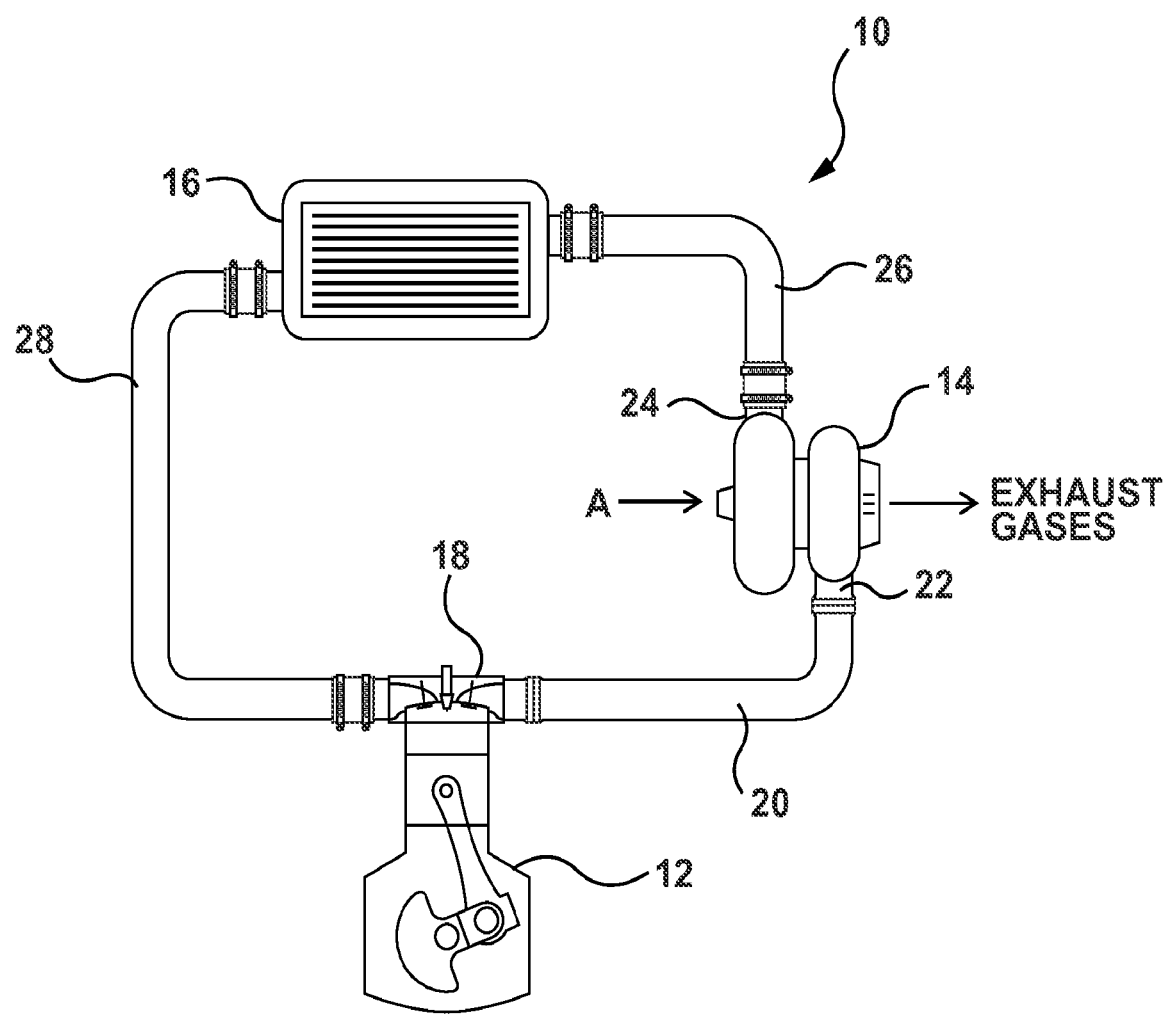
FIG. 1 is a schematic representation of an exemplary engine assembly having a turbocharger and intercooler assembly.

As turbocharger systems are known, operational details will only be briefly addressed. In general, turbochargers are a type of forced induction system, where exhaust gases are used to compress ambient air prior to entry into the intake manifold, having the effect of increased power and engine efficiency. In some systems, an intercooler may be implemented to cool and increase the density of the compressed ambient air prior to introduction into the engine. Having regard to FIG. 1, shown is an exemplary simplified engine assembly 10 having an engine 12, a turbocharger 14, and an intercooler 16. In operation, exhaust gases discharged from exhaust port 18 of engine 12 are directed through an exhaust manifold 20 to an inlet port 22 of turbocharger 14. The exhaust gases impact upon a turbine wheel, causing it, as well as a coupled compressor wheel to spin at high speed. The spinning compressor wheel draws in ambient air A and compresses it; the compressed ambient air then being discharged via outlet port 24 in the direction of engine 12 through intercooler 16 situated therebetween. Accordingly, the compressed ambient air is directed through a first turbo duct 26, situated between turbocharger 14 and intercooler 16, and a second turbo duct 28, situated between intercooler 16 and engine 12. As a result of compression and friction, the compressed ambient air is considerably heated. Accordingly, relative to intercooler 16, turbo duct 26 is regarded as the hot side turbo duct, while turbo duct 28 is regarded as the cold side turbo duct. For ease of explanation, for the description that follows, attention will be directed to the construction of turbo duct 26 (the hot side turbo duct). As will be appreciated, the features and variations described will be equally applicable to the construction of turbo duct 28 (the cold side turbo duct).

Figure 2:
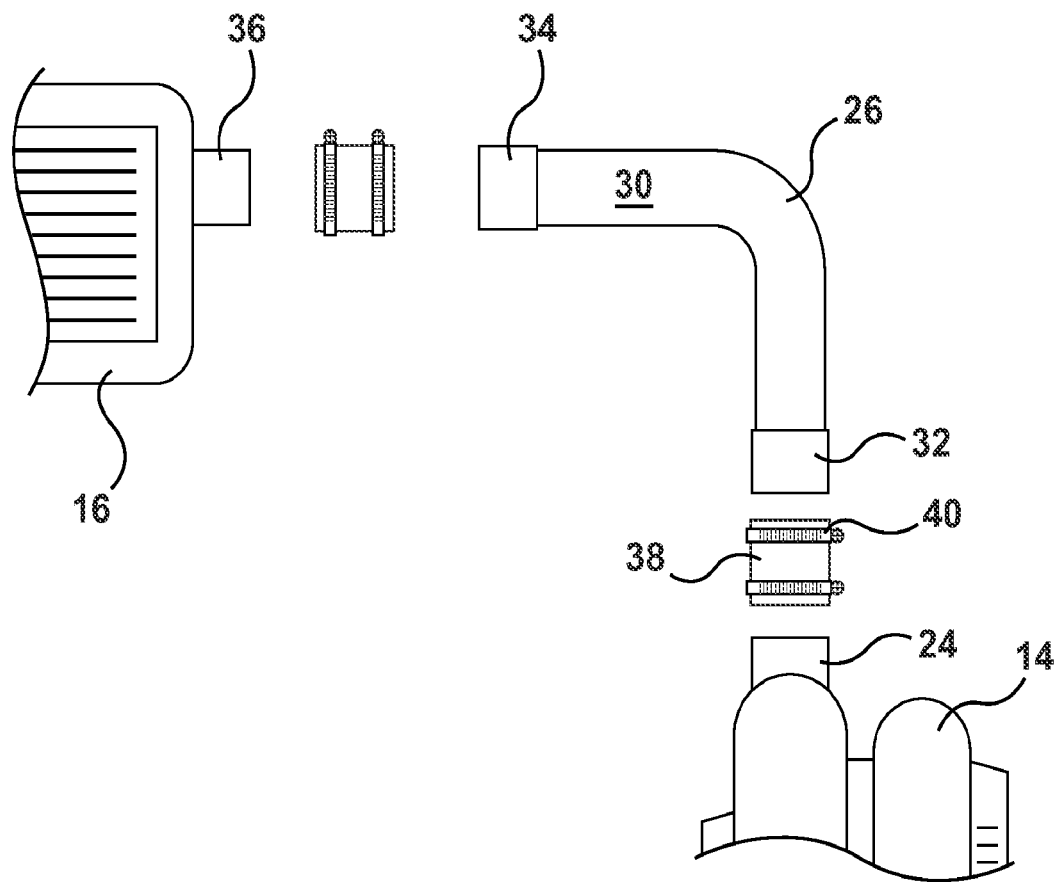
FIG. 2 is an exploded view of an exemplary hot side turbo duct in relation to a turbocharger and intercooler

Turning now to FIG. 2, a simplified turbo duct 26 is shown as having a primary body 30 that provides an inlet end 32, an outlet end 34, and an internal air passageway that communicates therebetween. Inlet end 32 is arranged to couple turbo duct 26 to outlet 24 of turbocharger 14, while outlet end 34 is arranged to couple turbo duct 26 to the inlet 36 of intercooler 16. More specifically, at the connection point to turbocharger 14, both turbocharger outlet 24 and turbo duct inlet end 32 are dimensioned to receive a cuff 38, with cuff 38 being securely retained in place by way of one or more suitable clamps 40 (e.g. band clamps, T-bar clamps, etc.). Similarly, the connection between turbo duct outlet end 34 and inlet 36 of intercooler 16 also uses a cuff/clamp 38, 40 arrangement.

In general, clamp 40 exerts a radially inward compressive force upon cuff 38, which in turn engages turbo duct 26 thus securing it thereto. To ensure a secure connection, the inward compressive radial force can be considerable, thus subjecting the connection points, namely inlet and outlet ends 32, 34 to considerable stress.

Figure 3A:
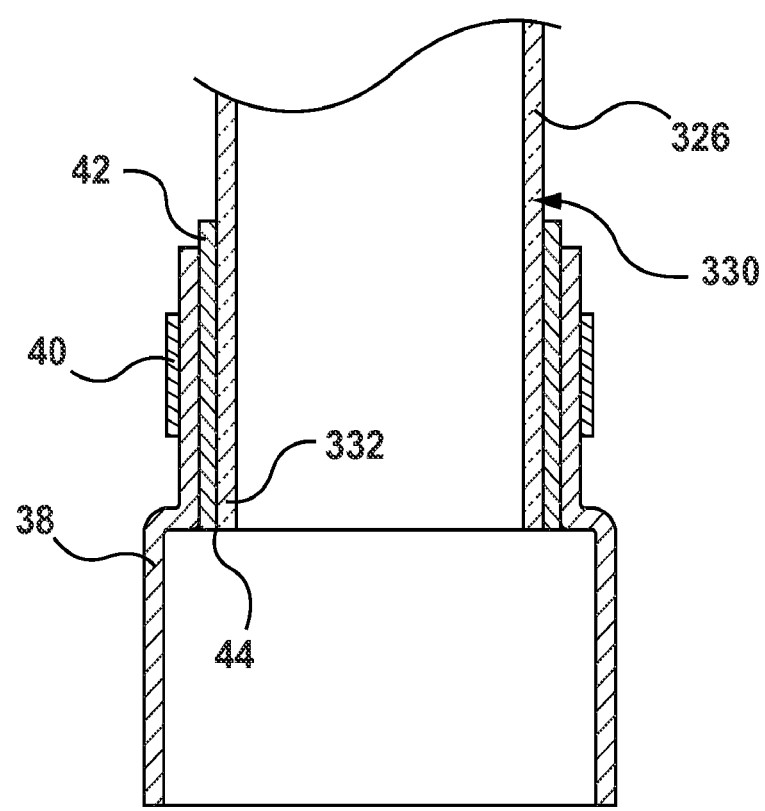
FIG. 3a is a first embodiment of a turbo duct and anti-crush ring arrangement utilizing friction fit.

Turning now to FIG. 3a, a first embodiment of a turbo duct 326 is shown that includes a primary body 330 and an inlet 332. To provide increased anti-crush resistance under the aforementioned radial compressive forces, inlet end 332 incorporates an anti-crush ring 42. Anti-crush ring 42 is provided as an intermediate anti-crush structure situated between the opposing surfaces of inlet end 332 and cuff 38, and is formed of a suitable material, as noted below, that is not susceptible to material creep. Anti-crush ring 42 is firmly and securely attached to primary body 330 of turbo duct 326, and this can be achieved in a number of different ways. In the embodiment shown in FIG. 3a, anti-crush ring 42 is retained in position by way of friction fit at interface 44. During assembly, cuff 38 is situated over anti-crush ring 42 and secured thereto by way of clamp 40.

As will be appreciated, the interface 44 between anti-crush ring 42 and turbo duct 326 may be configured in a variety of different ways, to modify the extent of frictional engagement and/or mechanical interlock therebetween. Having regard to FIGS. 3b through 3i, an assortment of exemplary alternate embodiments are shown, each of which implement an anti-crush ring in accordance with embodiments hereof as a means to increase anti-crush resistance under radial compressive forces.

Figure 3B:
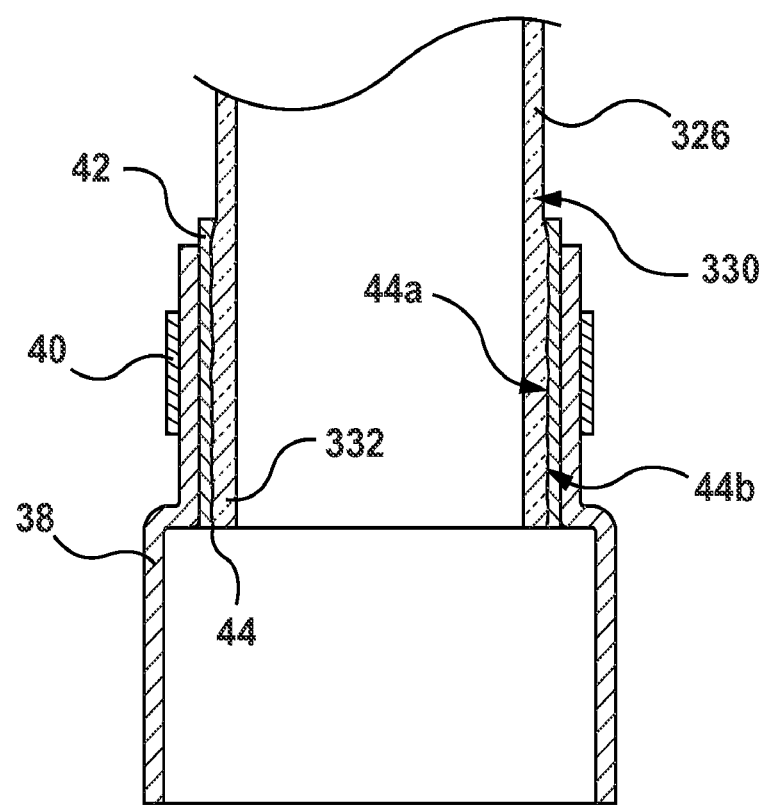
FIG. 3b is a second embodiment of a turbo duct and anti-crush ring arrangement in which the interface between the turbo duct and the anti-crush ring is textured to increase surface friction.

Having regard to FIG. 3b, the contact surfaces 44a, 44b defining interface 44 between anti-crush ring 42 and a primary body 330 of turbo duct 326 may be textured to increase surface friction. The texture used may be a regular textured pattern provided on one or both contact surfaces 44a, 44b of anti-crush ring 42 and primary body 330, or a random pattern, again on one or both contact surfaces 44a, 44b.

Figure 3C:
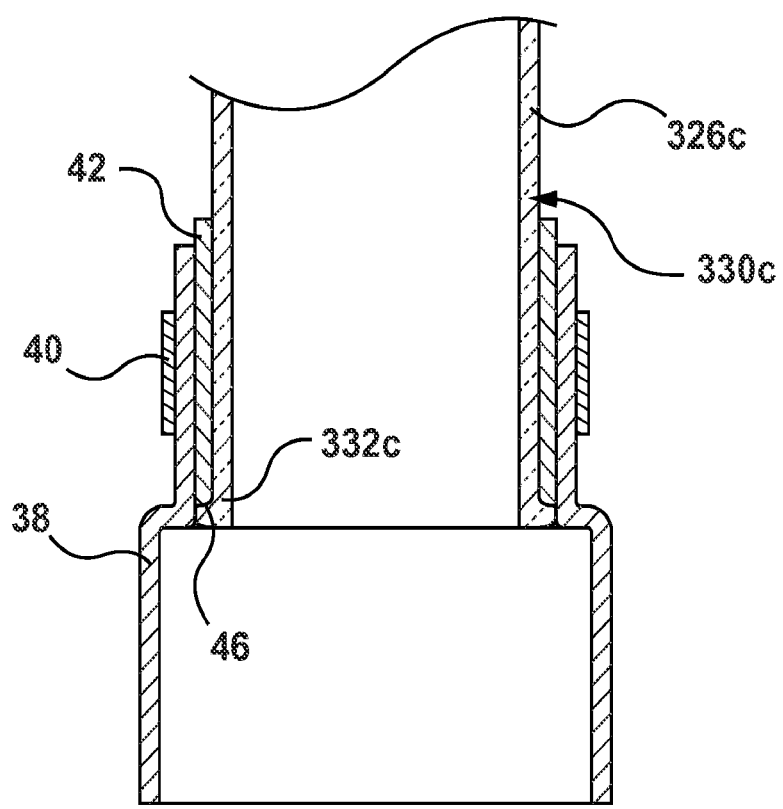
FIG. 3c is a third embodiment of a turbo duct and anti-crush ring arrangement wherein a terminal portion of the turbo duct is configured with a shoulder.
Figure 3D:
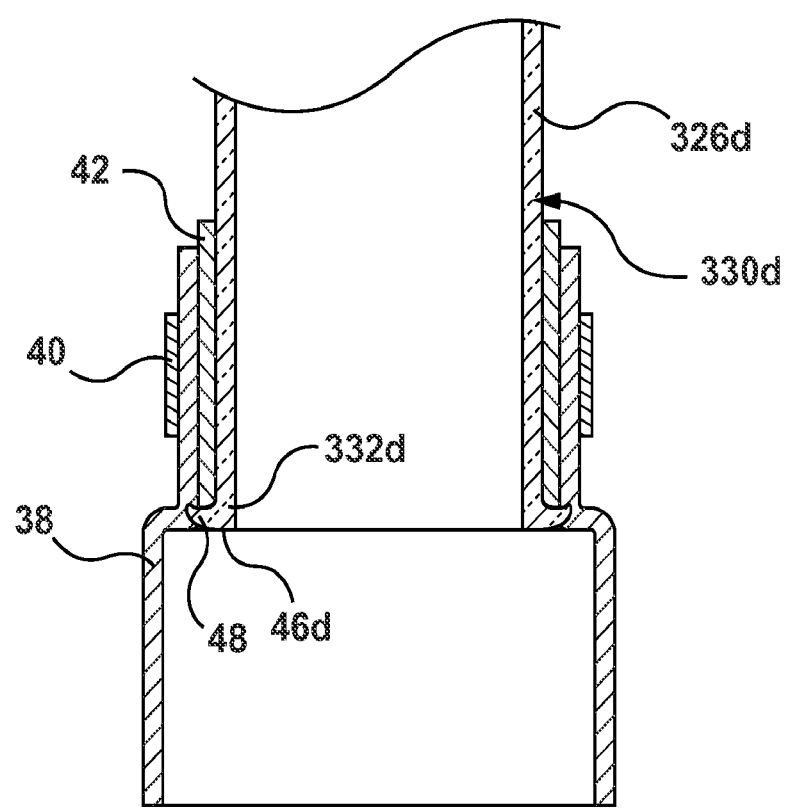
FIG. 3d is a fourth embodiment of a turbo duct and anti-crush ring arrangement, similar to that of FIG. 3c with the addition of a projection on the shoulder.

In FIG. 3c, a terminal portion of an inlet end 332c of primary body 330c is configured with a radial shoulder 46 that serves as a stop to prevent dislodgement of anti-crush ring 42 from a turbo duct 326c. Shoulder 46 may be continuous around the circumference of inlet end 332c, or may be discontinuous, that is where inlet end 332c is configured with one or more shoulder segments interspersed with non-shouldered regions. FIG. 3d illustrates a turbo duct 326d having a similar arrangement of a shoulder 46d provided on inlet end 332d of primary body 330d, where shoulder 46d additionally includes a radial projection 48 that provides additional physical/mechanical engagement with an inside surface of cuff 38, particularly when clamp 40 is tightened.

Figure 3E:
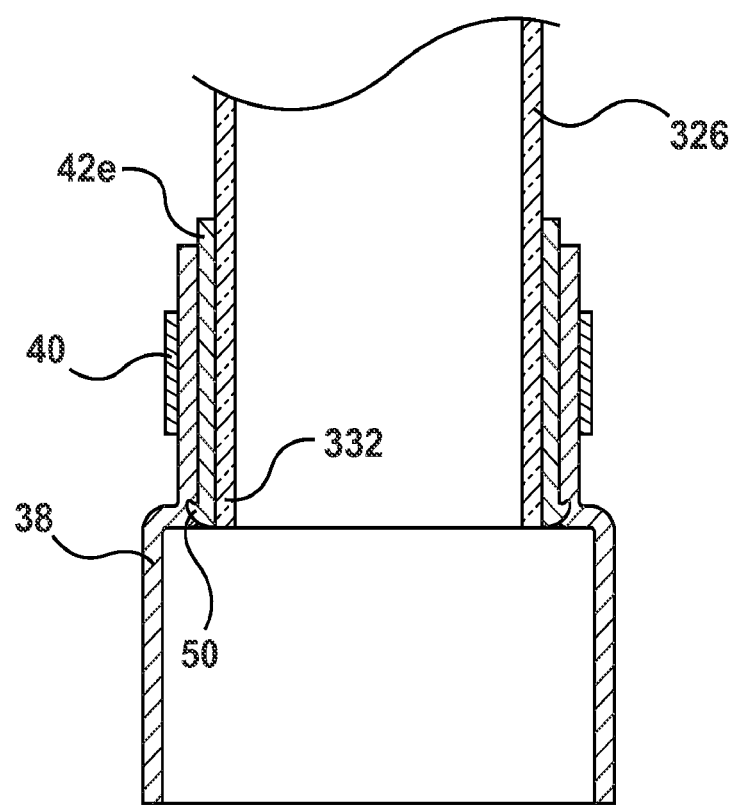
FIG. 3e is a fifth embodiment of a turbo duct and anti-crush ring arrangement wherein the anti-crush ring is configured with a barb.

FIG. 3e provides an embodiment where an anti-crush ring 42e is provided with a barb 50 that extends radially outwardly to engage cuff 38 and prevent accidental dislodgement. Barb 50 may be continuous around the entire circumference of the end region of anti-crush ring 42e, or may be comprised of one or more barb segments interspersed with non-barbed regions. As will be appreciated, additional barbs may be provided at additional locations along the length of anti-crush ring 42e.

Figure 3F:
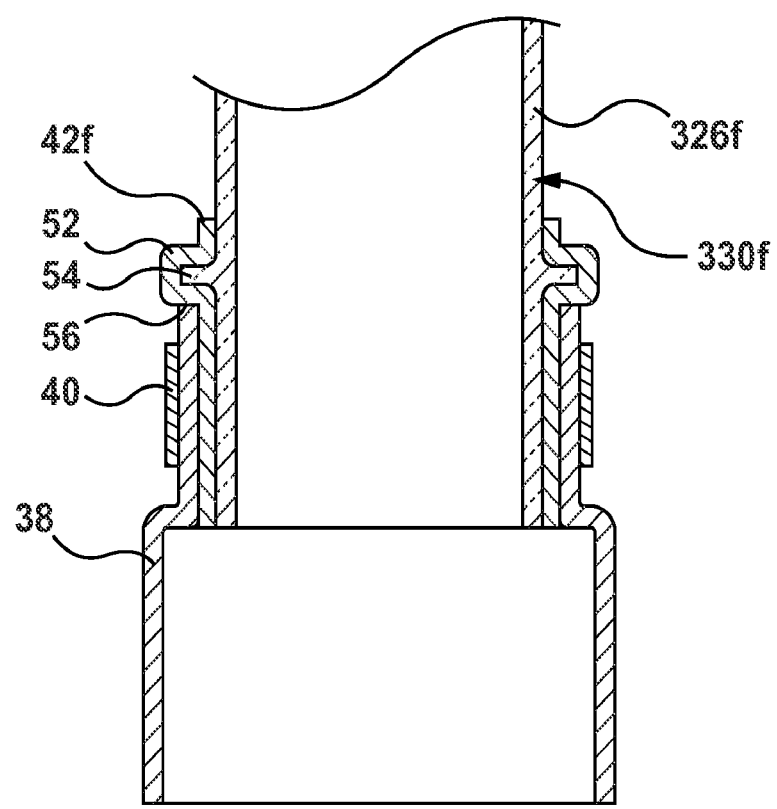
FIG. 3f is a sixth embodiment of a turbo duct and anti-crush ring arrangement wherein the anti-crush ring is configured with a channel to mechanically lock with the turbo duct.

FIG. 3f provides an embodiment where an anti-crush ring 42f is configured with a channel 52 that mechanically locks with a circumferential projection 54 formed on a primary body 330f of a turbo duct 326f, thereby preventing dislodgement therefrom. As shown, channel 52 is located so as to avoid interference with the contact surface for receipt of cuff 38. Channel 52 may also provide a shoulder 56 that presents a stop for proper installation/location of cuff 38 on turbo duct 326f.

Figure 3G:
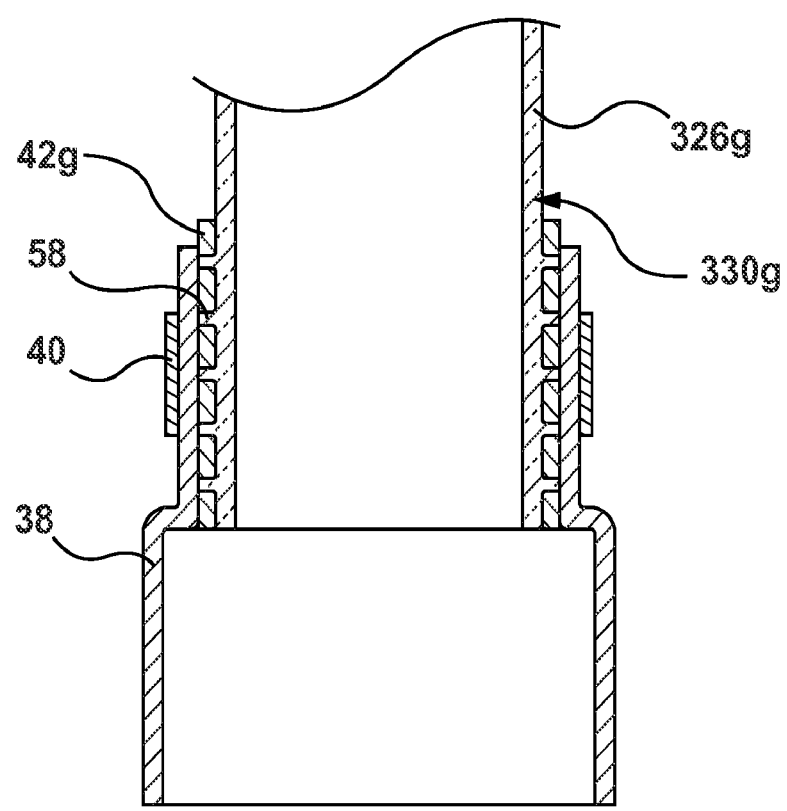
FIG. 3g is a seventh embodiment of a turbo duct and anti-crush ring arrangement wherein the anti-crush ring is provided with voids to mechanically lock with the turbo duct.
Figure 3H:
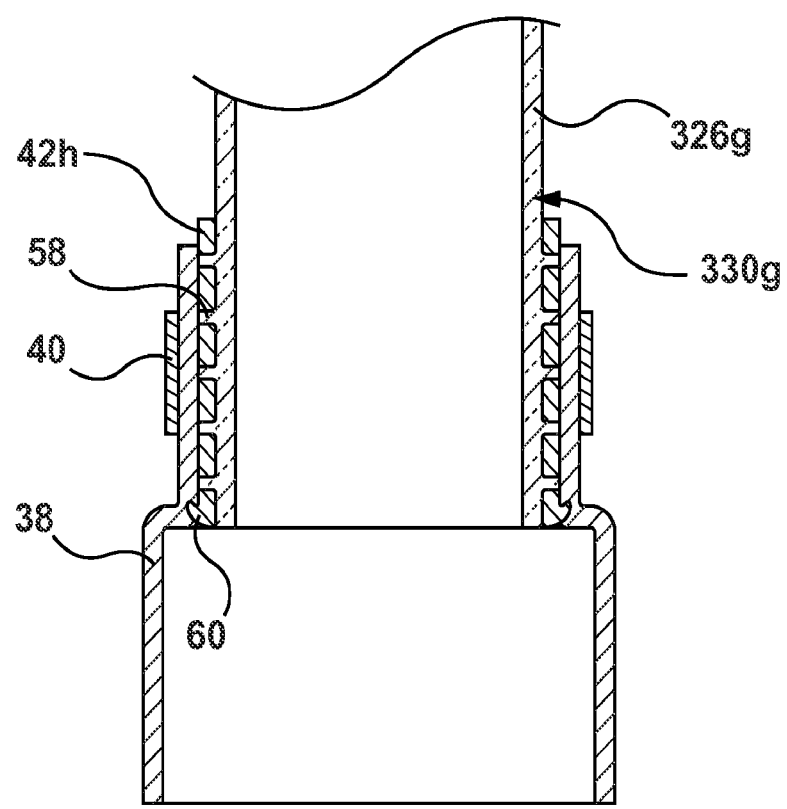
FIG. 3h is an eighth embodiment of a turbo duct and anti-crush ring arrangement similar to that of FIG. 3g, with the addition of a barb.

In FIG. 3g, a still further embodiment of an anti-crush ring 42g is presented, in which anti-crush ring 42g is provided with one or more voids 58 to enable a mechanical interlock with a primary body 330g of a turbo duct 326g when formed. During manufacture, the material forming primary body 330g of turbo duct 326g is permitted to flow into the one or more voids 58 of anti-crush ring 42g, thus ensuring secure engagement therebetween. FIG. 3h is a similar arrangement to that shown in FIG. 3g, with an additional barb 60 provided on an anti-crush ring 42h. Barb 60 may be continuous around the entire circumference of the end region of anti-crush ring 42h, or may comprise of one or more barb segments interspersed with non-barbed regions. As will be appreciated, additional barbs may be provided at additional locations along the length of anti-crush ring 42h.

Figure 3I:
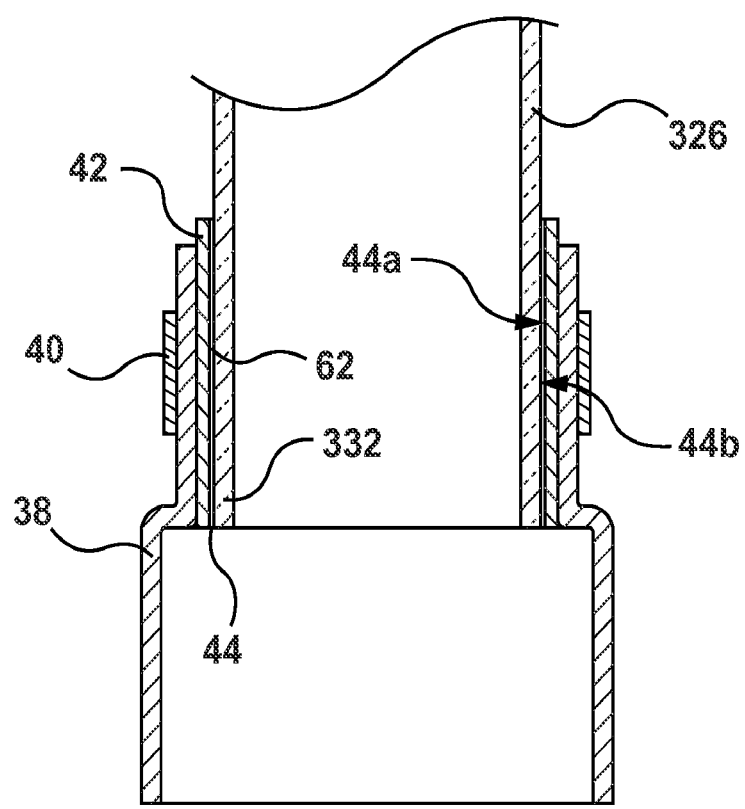
FIG. 3i is a ninth embodiment of a turbo duct and anti-crush ring arrangement wherein an adhesive is used at the interface between the turbo duct and the anti-crush ring.

FIG. 3i provides a similar arrangement to FIG. 3a, with the exception that an adhesive 62 is used at interface 44 between contact surfaces 44a, 44b of anti-crush ring 42 and primary body 330 of turbo duct 326, respectively.

It will be appreciated that interface 44 between an anti-crush ring and a primary body of a turbo duct in accordance herewith can be configured in various ways, and that the above arrangements are merely exemplary. It should be noted that while the implementation of an anti-crush ring has been exemplified having regard to an inlet end of the turbo ducts shown in FIGS. 3a to 3i, an outlet end may be similarly configured. In some turbo ducts, an anti-crush ring in accordance herewith may be incorporated into one or both of the inlet and outlet ends. It should also be noted that for either of the inlet or outlet ends the various design features shown in the embodiments of FIGS. 3a to 3i may be used in combination with any other design features, where deemed compatible and appropriate. For example, the barbed anti-crush ring 42e in FIG. 3e may be used in combination with an adhesive, as shown in FIG. 3i to achieve a desired performance characteristic.

It will be appreciated that the configuration of cuff 38, in particular the stepped profile shown in FIGS. 3a to 3i is merely exemplary. Other arrangements may implement a cuff having a constant inside/outside diameter, or other configurations as deemed appropriate for the intended coupling.

In a coupling that is secured by way of a band clamp or similar device configured to impart a compressive radial load, maintenance and longevity of the connection relies on a static/constant dimension (i.e. outside diameter) of the structure being engaged. Where the structure accepting the load is based on thermoplastic or thermoset materials, a certain degree of material creep may occur, potentially altering its dimensional characteristics. This could lead to a loosening of the coupling, resulting in leaks or a catastrophic failure. Such events have occurred in prior art systems having anti-crush rings positioned on the inside diameter of the duct.

In the various arrangements detailed above, the anti-crush ring is located on the exterior surface of the turbo duct, placing it in direct contact with the cuff. In this way, the likelihood of material creep (generally from the intermediate thermoplastic or thermoset material in prior art configurations) is reduced. The placement of the anti-crush ring on the exterior surface of the turbo duct also improves duct air flow characteristics, and reduces the likelihood of manufacturing and/or degradation debris from entering the engine.

Attention will now be directed to an exemplary process for manufacturing a turbo duct according to any of those described above. The turbo duct, for example a hot side turbo duct 326 may be manufactured using a blow-molding process, for example a flashless methodology such as suction (vacuum assist) blow-molding. The steps employed to manufacture turbo duct 326 according to this embodiment are shown diagrammatically in FIGS. 4a through 4e.

Figure 4A:
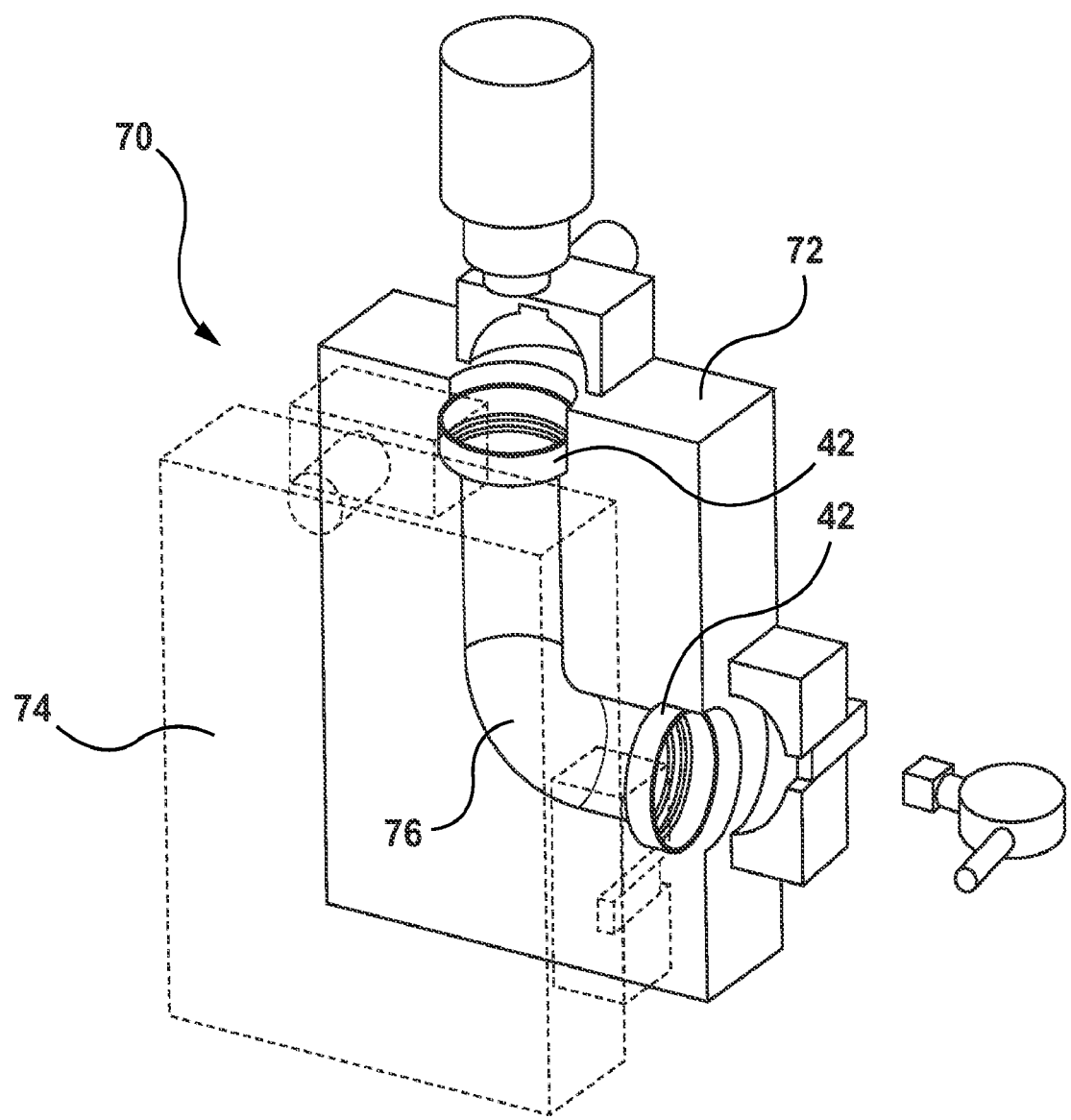
FIG. 4a is a schematic representation of an exemplary mold tool for producing a turbo duct in accordance with an embodiment of the invention.

Starting with FIG. 4a, a turbo duct is formed using a mold tool 70 having a first mold half 72 and a second mold half 74 (shown in dot) that together define cavity 76 for forming the desired hollow article. In FIG. 4a, mold tool 70 is shown at the initial step in the process, where first and second mold halves 72, 74 are open. During this initial step, an anti-crush ring in accordance herewith, such as anti-crush ring 42, is positioned within mold tool 70, generally on one of first or second mold halves 72, 74 as shown. In general, one or both mold halves 72, 74 are configured to receive and retain in proper position anti-crush ring 42 during this initial step in the manufacturing process. Positioning of anti-crush ring 42 on the mold half may be accomplished either by a machine operator, or by way of suitable robot tooling. As shown, an anti-crush ring 42 is provided at each end of cavity 76.

Figure 4B:
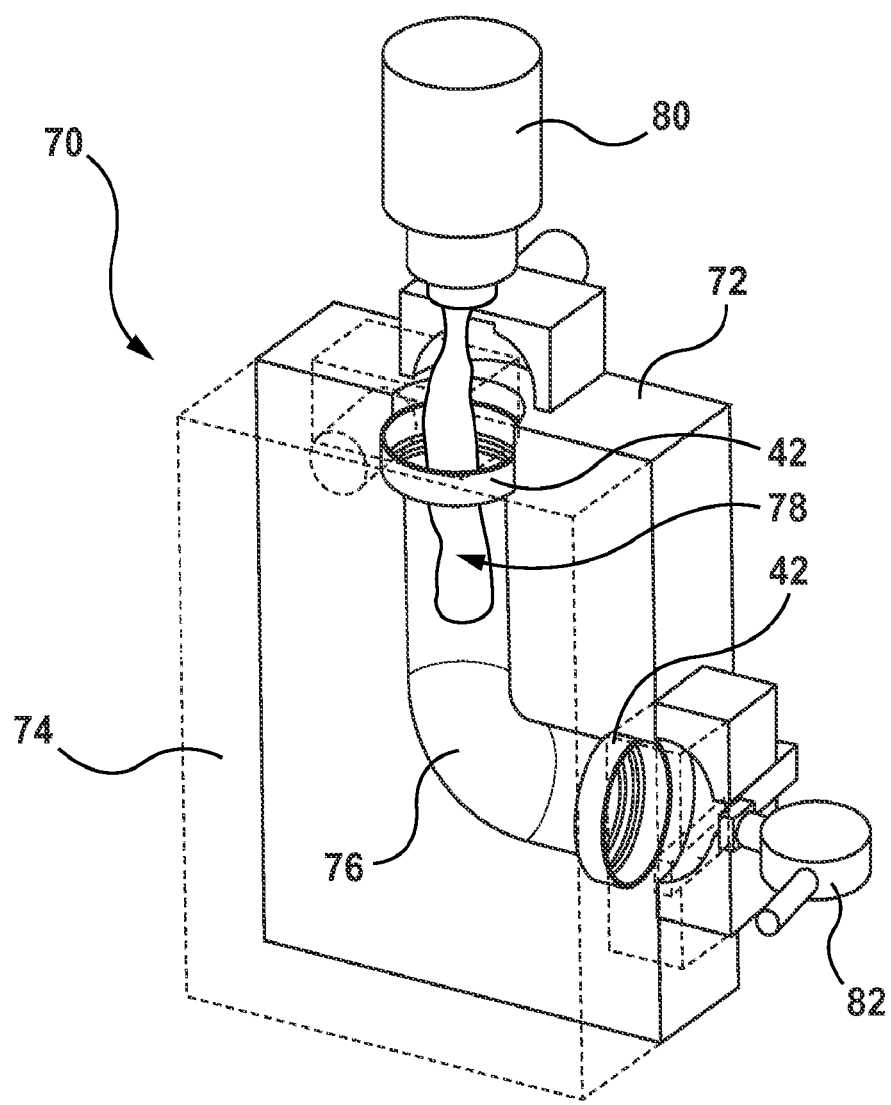
FIG. 4b is a schematic representation of the mold tool of FIG. 4a, wherein a parison is being introduced into the mold tool.
Figure 4C:
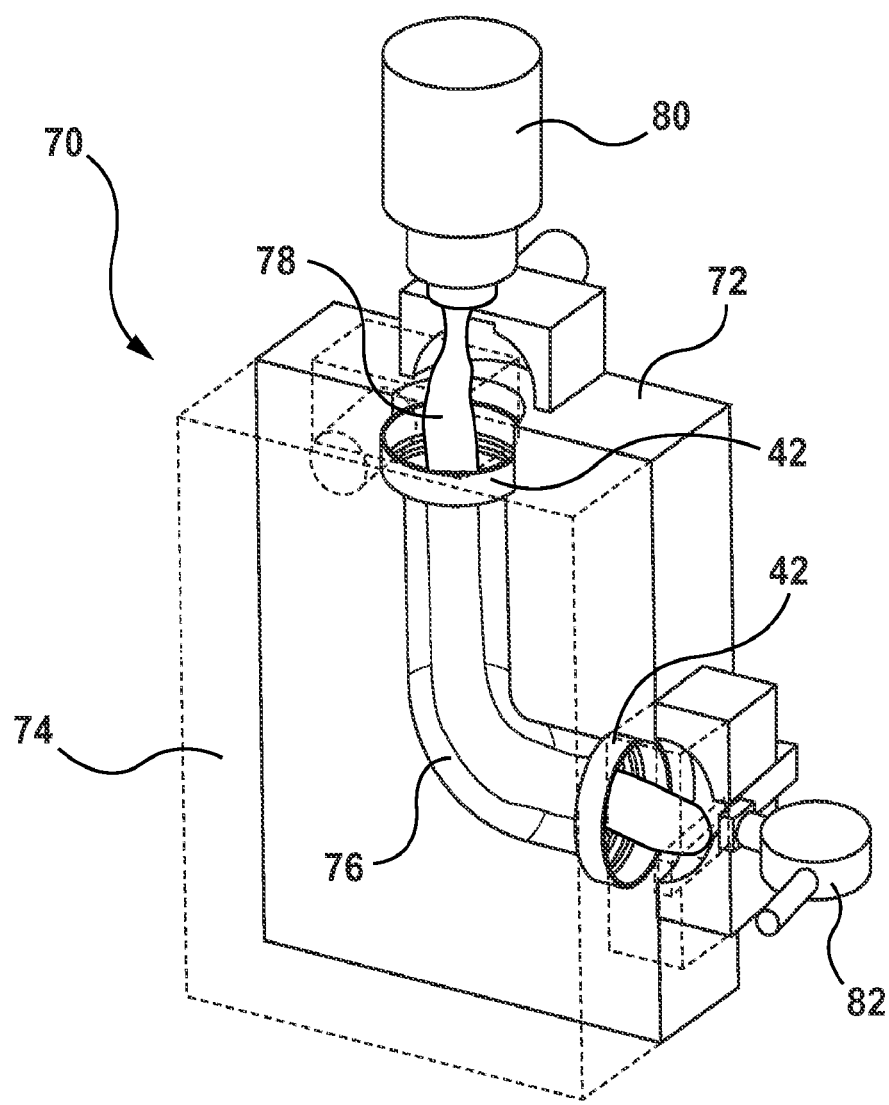
FIG. 4c is a schematic representation of the mold tool of FIG. 4a, wherein the parison is fully positioned within the molding cavity of the mold tool.

As shown in FIGS. 4b and 4c, with anti-crush ring 42 in position, mold tool 70 is closed and readied to receive an extruded parison 78 from a suitably positioned extruder 80. A vacuum source 82 is applied to the bottom of mold tool 70, serving to draw extruded parison 78 through cavity 76, and anti-crush rings 42 positioned therein.

Figure 4D:
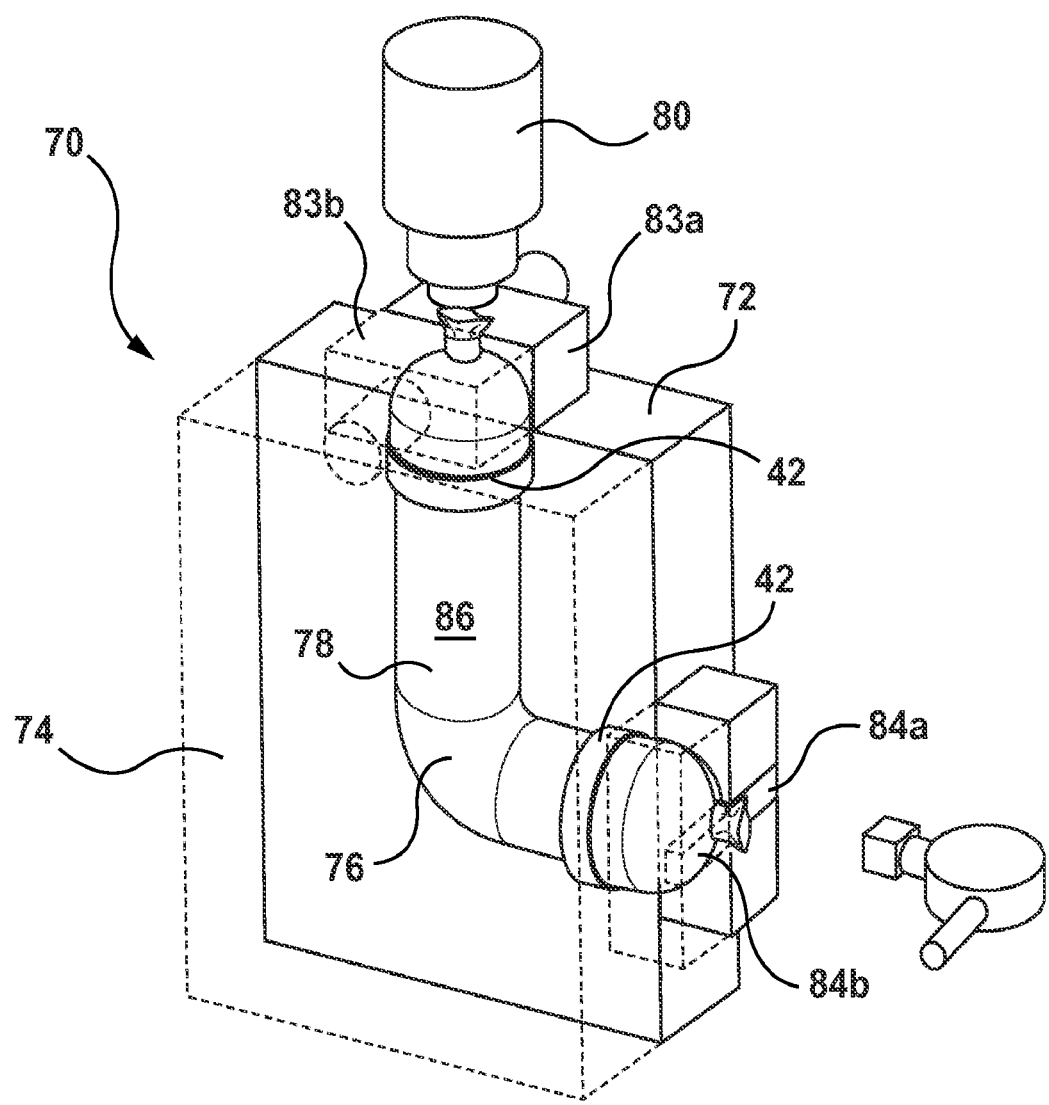
FIG. 4d is a schematic representation of the mold tool of FIG. 4a, wherein the parison is blow molded.

Turning to FIG. 4d, the bottom and top of parison 78 is then pinched using respective pinch plate assemblies 83a/83b, 84a/84b, thereby sealing parison 78 and establishing a closed internal chamber 86. By way of one or more blow pins (not shown), closed internal chamber 86 of parison 78 is then inflated, generally using air, to urge it against the contours of cavity 76.

Figure 4E:
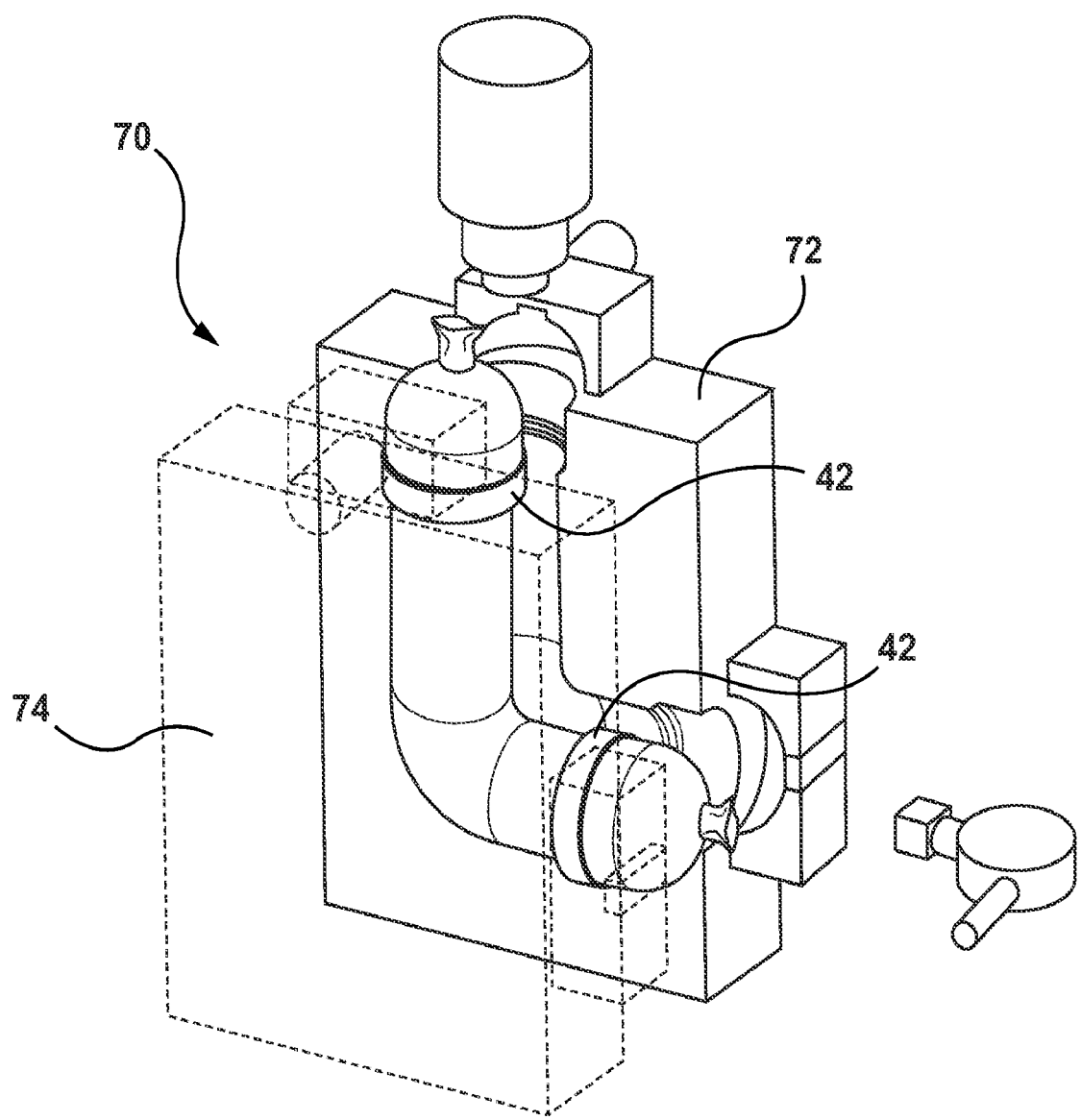
FIG. 4e is a schematic representation of the mold tool of FIG. 4a, wherein the formed turbo duct is released from the mold tool.
Figure 5:
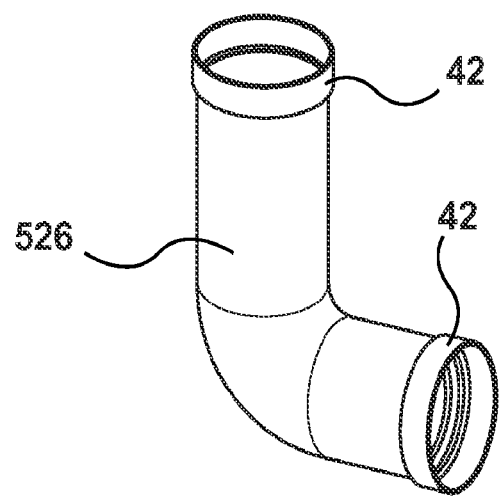
FIG. 5 shows an exemplary turbo duct formed using the mold tool of FIG. 4a, following post-mold processing.

On sufficient cooling, mold tool 70 is opened (as shown in FIG. 4e) so as to release the formed hollow article. As generally known with suction blow-molding, the process is largely flashless, thus requiring minimal (if any) removal of flash. Post-mold processing therefore is minimized, and may only be employed to finish-cut the ends to form the respective inlet/outlet openings, thereby forming a completed turbo duct 526, as shown in FIG. 5.

It will be appreciated that the above represents an exemplary manufacturing process, and that other manufacturing methodologies, such as processes based on conventional blow molding may be implemented. It will also be appreciated that the configuration shown for the aforementioned suction blow molding process is merely exemplary, as alternate arrangements of the various components is possible.

The manufacture of turbo duct 526 having an insert-molded anti-crush ring 42 has been described having regard to an exemplary flashless blow-molding methodology. For ease of explanation, the mold tool has been described as having a first and second mold half. It will be appreciated that this arrangement for the mold tool is merely exemplary, as the mold tool may in fact comprise more than two mold elements. For example, depending on the configuration of the desired hollow article, each mold half may in fact comprise multiple independently controlled mold segments.

A range of suitable materials may be used to form the turbo duct, the selection of which will depend on the required performance characteristics. Exemplary materials include, but are not limited to polypropylene, polyethylene, nylon, polyphenylene ether (PPE), polyphenylene sulfide (PPS), and combinations thereof. These materials are both commercially available and under development addressing specific areas of thermal plastic conversion such as improved thermal oxidative properties associated with high heat and a low pH operating environment, improved burst characteristics associated with turbo charger surge pressures and improved creep and shrink resistance to hold dimensional capability of the molded component. For the anti-crush ring, suitable materials would include those not susceptible to material creep, including, but not limited to, lightweight aluminum, magnesium and hybrid steel solutions developed for weight savings. Glass or carbon fiber orientated thermal plastic tapes could also be utilized, as well as combinations thereof.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-descried exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. A system comprising:
   a turbo duct configured for use in an engine assembly, the turbo duct including
   a primary body having an inlet end, an outlet end, and an internal air passageway that communicates therebetween, the primary body having a first length, and
   an anti-crush ring disposed on an outside surface of the primary body at one of the inlet end and the outlet end, the anti-crush ring having a second length that is less than the first length, wherein the anti-crush ring is configured with a channel that is dimensioned to fully receive therein an entire cooperating circumferential projection on the primary body, and wherein the channel mechanically locks to the cooperating circumferential projection; and
   a cuff configured to connect the one of the inlet end and the outlet end of the primary body to a component within the engine assembly, wherein the cuff is tubular and dimensioned to receive the one of the inlet end and the outlet end of the primary body;
   at least one clamp, wherein the at least one clamp is configured to exert a radially inward compressive force upon the cuff to secure the cuff to the turbo duct when the cuff is assembled onto the one of the inlet end and the outlet end of the primary body,
   wherein, when the cuff is assembled onto the one of the inlet end and the outlet end of the primary body, the anti-crush ring forms an intermediate anti-crush structure between opposing surfaces of the one of the inlet end and the outlet end of the primary body and the cuff.

2. The system of claim 1, wherein the anti-crush ring is disposed on the inlet end of the primary body and the component within the engine assembly is a turbocharger.

3. The system of claim 1, wherein the anti-crush ring is disposed on the outlet end of the primary body and the component within the engine assembly is an intercooler.

4. The system of claim 1, wherein the channel is shaped so as to provide a shoulder that presents a stop for proper location of the cuff on the turbo duct such that an end of the cuff abuts against the stop when the cuff is assembled onto the one of the inlet end and the outlet end of the primary body.

5. The system of claim 1, wherein the one of the inlet end and the outlet end of the primary body has a contact surface for receiving the cuff when the cuff is assembled onto the one of the inlet end and the outlet end of the primary body, and wherein the channel is positioned to avoid interference with the contact surface.

6. The system of claim 1, wherein the anti-crush ring is made of lightweight aluminum, magnesium, hybrid steel solutions, or a combination thereof.

7. The system of claim 1, wherein the primary body is made of polypropylene, polyethylene, nylon, polyphenylene ether, polyphenylene sulfide, or a combination thereof.

8. The system of claim 1, wherein the primary body is formed from a thermoplastic or thermoset material and the anti-crush ring is formed from a material not susceptible to material creep.

* * * * *